US012711608B2

(12) United States Patent
Ravela et al.

(10) Patent No.: US 12,711,608 B2
(45) Date of Patent: Aug. 18, 2026

(54) INSPECTING PARTS USING GEOMETRIC MODELS

(71) Applicant: RTX Corporation, Farmington, CT (US)

(72) Inventors: Srinivas Ravela, Farmington, CT (US); Alan Matthew Finn, Chapel Hill, NC (US); Ozgur Erdinc, Mansfield, CT (US); Sergio S. Frutuoso, Avon, CT (US); Eugene B. Donskoy, Marblehead, MA (US); Joseph A. Sylvestro, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 149 days.

(21) Appl. No.: 18/437,350

(22) Filed: Feb. 9, 2024

(65) Prior Publication Data

US 2024/0273706 A1 Aug. 15, 2024

Related U.S. Application Data

(60) Provisional application No. 63/484,336, filed on Feb. 10, 2023.

(51) Int. Cl.
*G06T 7/70* (2017.01)
*B25J 19/02* (2006.01)
(Continued)

(52) U.S. Cl.
CPC ............. *G06T 7/001* (2013.01); *B25J 19/021* (2013.01); *G06T 7/70* (2017.01); *G06T 17/00* (2013.01);
(Continued)

(58) Field of Classification Search
CPC ........... G06T 7/001; G06T 7/70; G06T 17/00; G06T 2207/30164; G06T 2207/30244; B25J 19/021; G06V 10/751; G06V 10/764
(Continued)

(56) References Cited

U.S. PATENT DOCUMENTS 9,494,532 B2 11/2016 Xie et al.
9,747,683 B2 8/2017 Subramaniyan et al.
(Continued)

OTHER PUBLICATIONS

Lucas et al. "Chapter 23—CAD-Based Vision Systems in Pattern Matching Process" in: "Expert Systems, Six-Volume Set" Expert Systems. Academic Press, (Jan. 2002) pp. 833-874.
(Continued)

*Primary Examiner* — Hai Tao Sun
(74) *Attorney, Agent, or Firm* — CANTOR COLBURN LLP

(57) ABSTRACT

Examples described herein provide a method that includes comparing features in an image of a part with features of models in a database and creating a list of candidate models for the part. The method further includes rendering a three-dimensional (3D) model at a pose/scale of an imaging system to generate a synthetic image that contains features of the part. The method further includes creating a part representation based on the features of the part, wherein the part representation depicts a defect of the part. The method further includes classifying a region of the part based on a set of rules for the part to determine whether the defect is within an allowable tolerance for the part.

11 Claims, 9 Drawing Sheets

(51) Int. Cl.
*G06T 7/00* (2017.01)
*G06T 17/00* (2006.01)
*G06V 10/764* (2022.01)
*G06V 10/75* (2022.01)

(52) U.S. Cl.
CPC ............... *G06T 2207/30164* (2013.01); *G06T 2207/30244* (2013.01); *G06V 10/751* (2022.01); *G06V 10/764* (2022.01)

(58) Field of Classification Search
USPC .......................................................... 345/419
See application file for complete search history.

(56) References Cited

U.S. PATENT DOCUMENTS 10,621,717 B2 4/2020 Wang et al.
11,268,881 B2 3/2022 Finn et al.
2016/0314571 A1 10/2016 Finn et al.
2018/0211373 A1* 7/2018 Stoppa ...................... G06T 7/55
2019/0130557 A1* 5/2019 Drescher ................... G06T 7/41
2019/0172191 A1* 6/2019 Finn .................... G01M 5/0033
2020/0090315 A1 3/2020 Jandhyala et al.
2020/0096967 A1 3/2020 Sykes et al.
2020/0340802 A1* 10/2020 Tyson .................... G01B 11/16

OTHER PUBLICATIONS

Partial Search Report issued in European Patent Application No. 24157214.8; Application Filing Date Feb. 12, 2024; Date of Mailing Jul. 23, 2024 (23 pages).

Search Report issued in European Patent Application No. 24157214.8; Application Filing Date Feb. 12, 2024; Date of Mailing Oct. 14, 2024 (16 pages).

* cited by examiner

INSPECTING PARTS USING GEOMETRIC MODELS

CROSS-REFERENCE TO RELATED APPLICATIONS

This application claims the benefit of U.S. Provisional Application No. 63/484,336 filed Feb. 10, 2023, the disclosure of which is incorporated herein by reference in its entirety.

BACKGROUND

The subject matter disclosed herein generally relates to inspecting parts using geometric models.

Turbine engines, such as gas turbine engines and hybrid electric turbine engines, use vanes to direct air within the engines. Turbine vanes direct and meter the hot combustion gasses onto turbine blades which spin to create rotational motion that is transferred to other turbine components such as a fan and/or compressor to create thrust and/or power. The direction and the amount of hot gas flow presented to a blade from the preceding vane can be directly correlated to the efficiency by which rotational energy can be extracted from the hot gas path flow. It is therefore useful to analyze components of turbine engines, such as vanes and turbine blades.

BRIEF DESCRIPTION

In one exemplary embodiment, a method is provided. The method includes comparing features in an image of a part with features of models in a database and creating a list of candidate models for the part. The method further includes rendering a three-dimensional (3D) model at a pose/scale of an imaging system to generate a synthetic image that contains features of the part. The method further includes creating a part representation based on the features of the part, wherein the part representation depicts a defect of the part. The method further includes classifying a region of the part based on a set of rules for the part to determine whether the defect is within an allowable tolerance for the part.

In addition to one or more of the features described herein, or as an alternative, further embodiments of the method may include capturing the image of the part using the imaging system.

In addition to one or more of the features described herein, or as an alternative, further embodiments of the method may include determining values for a camera using the part representation.

In addition to one or more of the features described herein, or as an alternative, further embodiments of the method may include estimating the pose/scale of the imaging system.

In addition to one or more of the features described herein, or as an alternative, further embodiments of the method may include that the synthetic image comprises an indicium associated with a defect of the part.

In another exemplary embodiment a processing system is provided. The processing system includes a memory having computer readable instructions and a processing device for executing the computer readable instructions. The computer readable instructions control the processing device to perform operations. The operations may include retrieving a three-dimensional (3D) model for a part. The operations may further include performing a stress analysis for the part based on the 3D model for the part to determine whether the part meets a performance specification.

In addition to one or more of the features described herein, or as an alternative, further embodiments of the processing system may include that retrieving the 3D model for the part includes: comparing features in an image of the part with features of models in a database and creating a list of candidate models for the part; rendering a three-dimensional (3D) model at a pose/scale of an imaging system to generate a synthetic image that contains features of the part; and creating a part representation based on the features of the part, wherein the part representation depicts a defect of the part.

In addition to one or more of the features described herein, or as an alternative, further embodiments of the processing system may include that the image of the part is captured using the imaging system.

In addition to one or more of the features described herein, or as an alternative, further embodiments of the processing system may include that a performance specification for the part defines a limit on a size of a defect for the part.

In addition to one or more of the features described herein, or as an alternative, further embodiments of the processing system may include that the performance specification for the part defines a limit on a number of defects for the part.

In addition to one or more of the features described herein, or as an alternative, further embodiments of the processing system may include that the performance specification for the part defines a limit a total amount of part deformity that is acceptable.

In yet another exemplary embodiment a method is provided. The method includes performing an optics-to-capturing-device transformation. The method further includes detecting a defect on an image plane. The defect includes, but is not limited to, a dent, a crack, or surface erosion. The method further includes transforming the defect to a point in a world coordinate system. The method further includes calculating an arm pose of a robotic arm based on the capturing device matching a location of the defect in a world coordinate system. The method further includes capturing, by the capturing device, an image of a part.

In addition to one or more of the features described herein, or as an alternative, further embodiments of the method may include that the capturing device is rigidly mounted to the robotic arm.

In addition to one or more of the features described herein, or as an alternative, further embodiments of the method may include that a calibration pattern is rigidly mounted to a base of the robotic arm.

In addition to one or more of the features described herein, or as an alternative, further embodiments of the method may include that the base is affixed to a rotary table The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
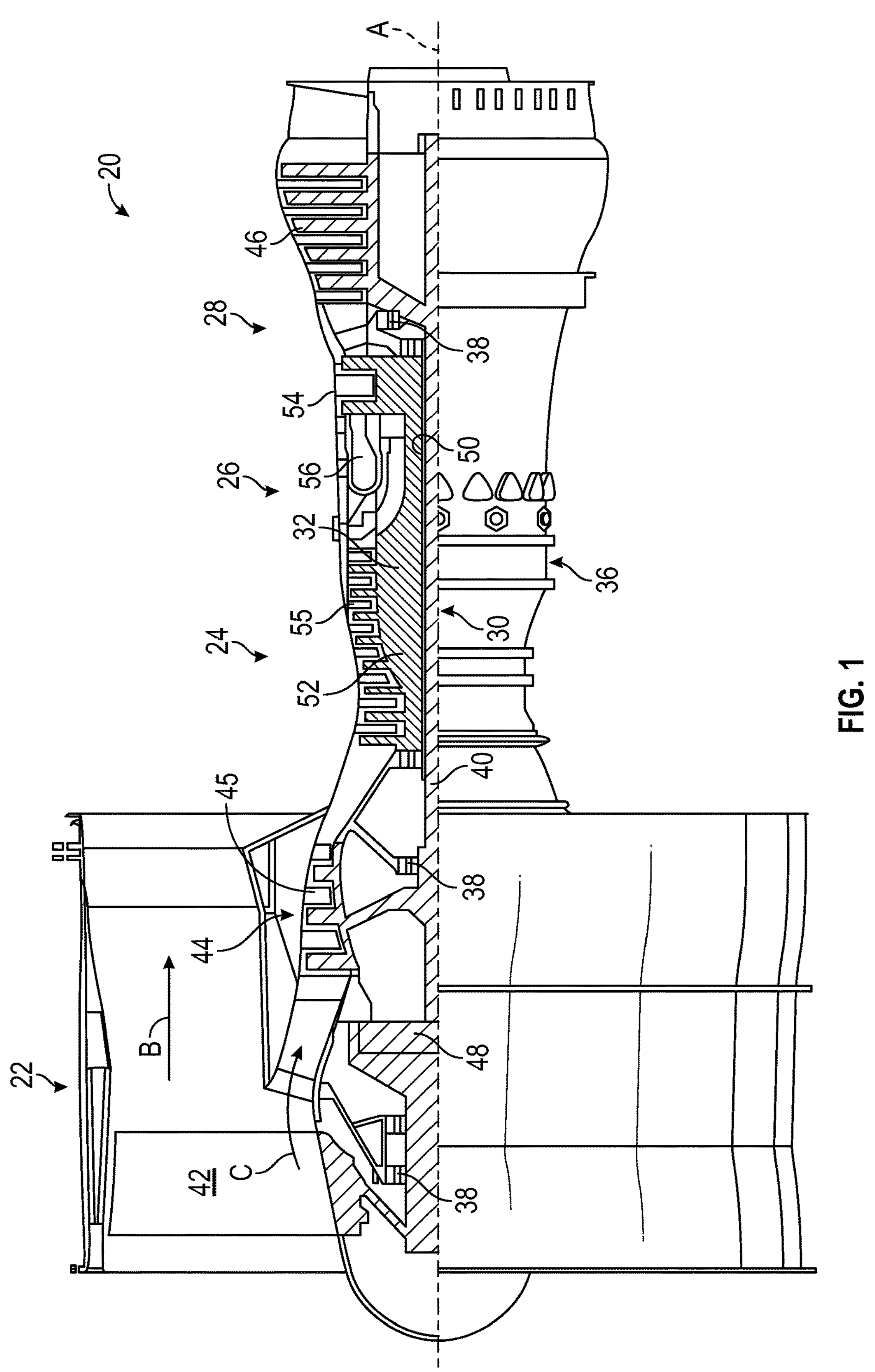
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, unducted fans, etc.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ\ \text{R})/(518.7^\circ\ \text{R})]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

One or more of the components of the gas turbine engine 20 can be inspected according to one or more embodiments described herein. For example, an embodiment provides a system for studying parts using geometric models, and another embodiment provides a method for an operator to investigate parts in real-time using models and data interactively. Although embodiments are described as inspecting components of the gas turbine engine 20, such as vanes and turbine blades, the scope of the claims is not so limited unless otherwise indicated, and the techniques described herein can be used to inspect other manufactured parts for which a geometric, appearance, texture, and dynamic model exists.

A conventional approach to part inspection in now described. A part, such as a turbine blade or vane, arrives for inspection. A human operator studies the part by manipulating it, possibly under a microscope, and viewing the part directly or observing its electronic image. Through visual inspection, the operator identifies defective areas of a part in accordance with the operator's training and knowledge. Unfortunately, this process lacks consistency, repeatability, or accuracy. The degree to which this affects the repair process is part-dependent but may be substantial, which could make quality control difficult. Such difficulties are characteristic of multiple inspection tasks throughout the repair sequence.

One or more embodiments described herein address these and other shortcomings by providing for inspecting parts using geometric models. For example, an embodiment involves using a reference model, such as a computer aided design (CAD) model for the part, but can also include a collection of pictures or 3D point-cloud scans taken at distinct views and modalities or a set of digital markings placed in an indexing system.

A capturing device, such as a camera, three-dimensional (3D) coordinate measurement device (e.g., a time of flight laser scanner), structured light 3D scanner, and/or the like, including combinations and/or multiples thereof, can be used to capture images or data for the part. The images or data need not be from the visible spectrum, e.g., from an infrared or ultraviolet camera or scanner. The images or data need not be from an electromagnetic phenomenon, e.g., from an ultrasonic sensor.

Figure 2:
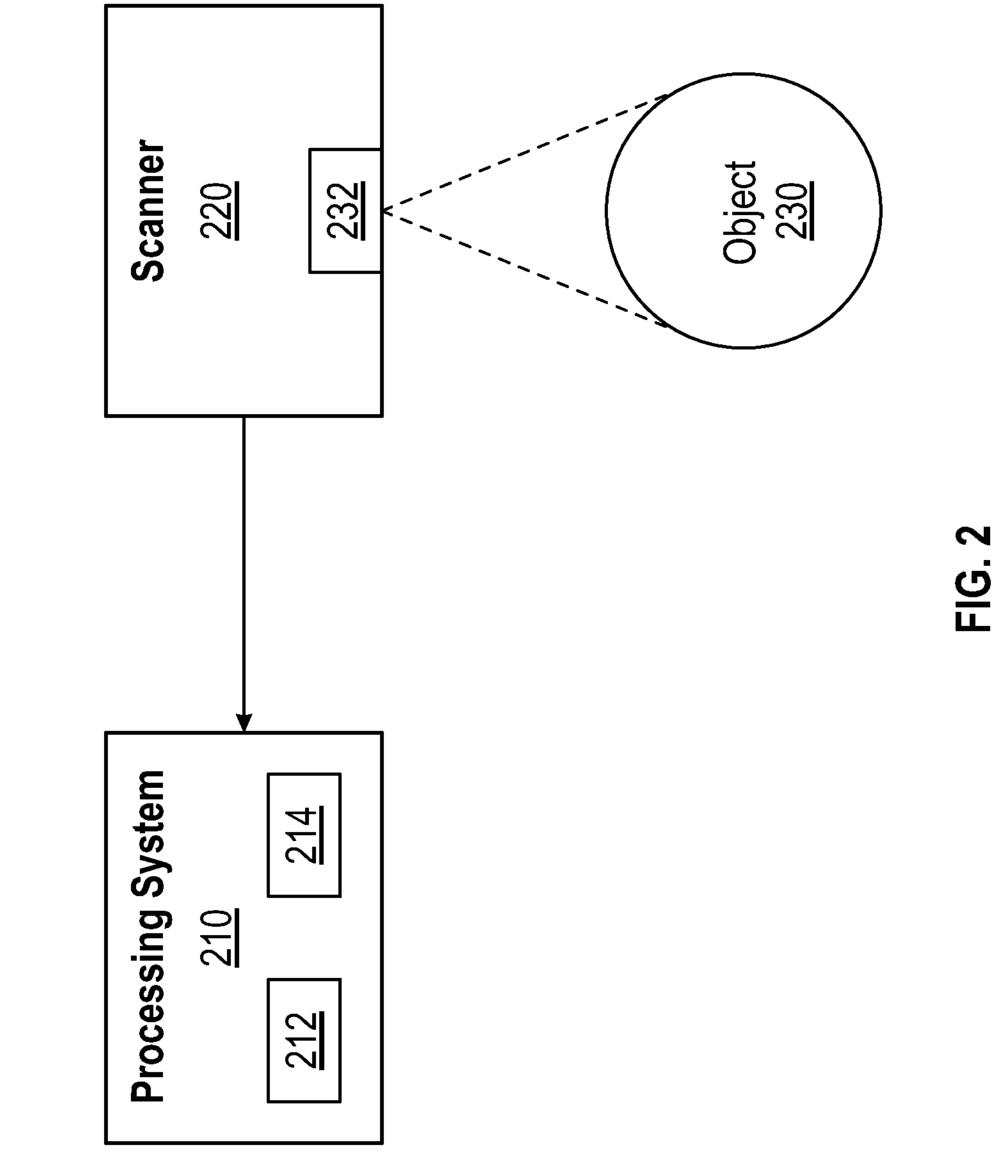
FIG. 2 is a block diagram of a system according to one or more embodiments described herein.

FIG. 2 is a block diagram of a system 200 according to one or more embodiments described herein. The system 200 includes a processing system 210 and a capturing device 220. The capturing device 220 can be any suitable device for capturing images or data for a part to be scanned, such as object 230. For example, the capturing device 220 may include a camera 232 to capture images of the object 230.

The processing system 210 receives data about the object 230 from the capturing device 220. According to an example, the capturing device 220 can use the images from a camera 232 to generate 3D data, such as using photogrammetry or another suitable technique. According to another example, the processing system 210 receives the images from the capturing device 220 and uses those images to generate the 3D data. The processing system 210 can use the 3D data to generate a mesh surface for the object 230, for example.

The features and functionality of the system 200 can be implemented, for example, as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these and/or the like. According to aspects of the present disclosure, the features and functionality described herein can be a combination of hardware and programming. The programming can be processor executable instructions stored on a tangible memory, and the hardware can include a processing device 212 for executing those instructions. Thus a system memory 214 (e.g., a random access memory, a read only memory, and/or the like, including combinations and/or multiples thereof) can store program instructions that when executed by the processing device 212 implement the features and functionality described herein.

Figure 3A:
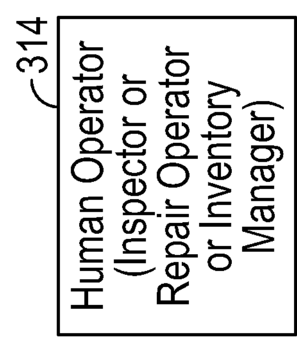
FIG. 3A depicts a block diagram of a system according to one or more embodiments described herein.
Figure 3A:
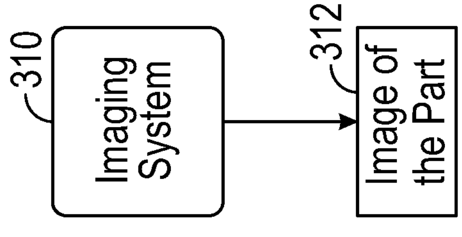
Figure 3A:
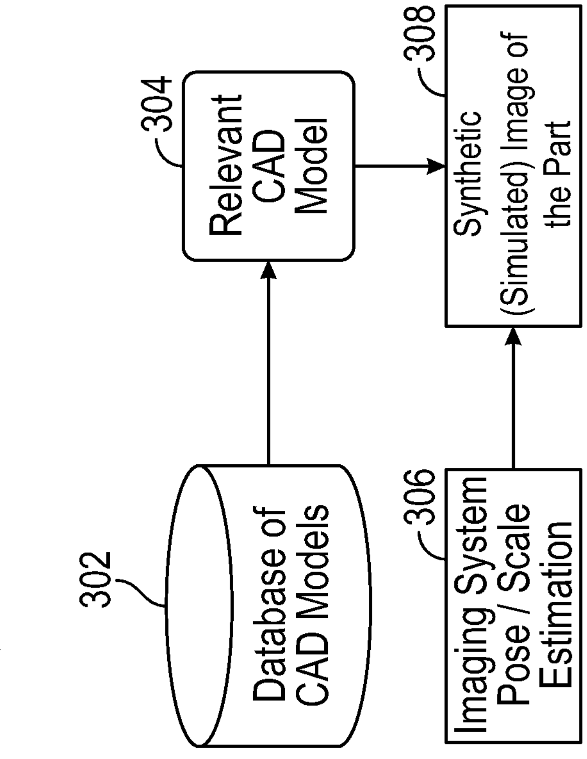
Figure 3B:
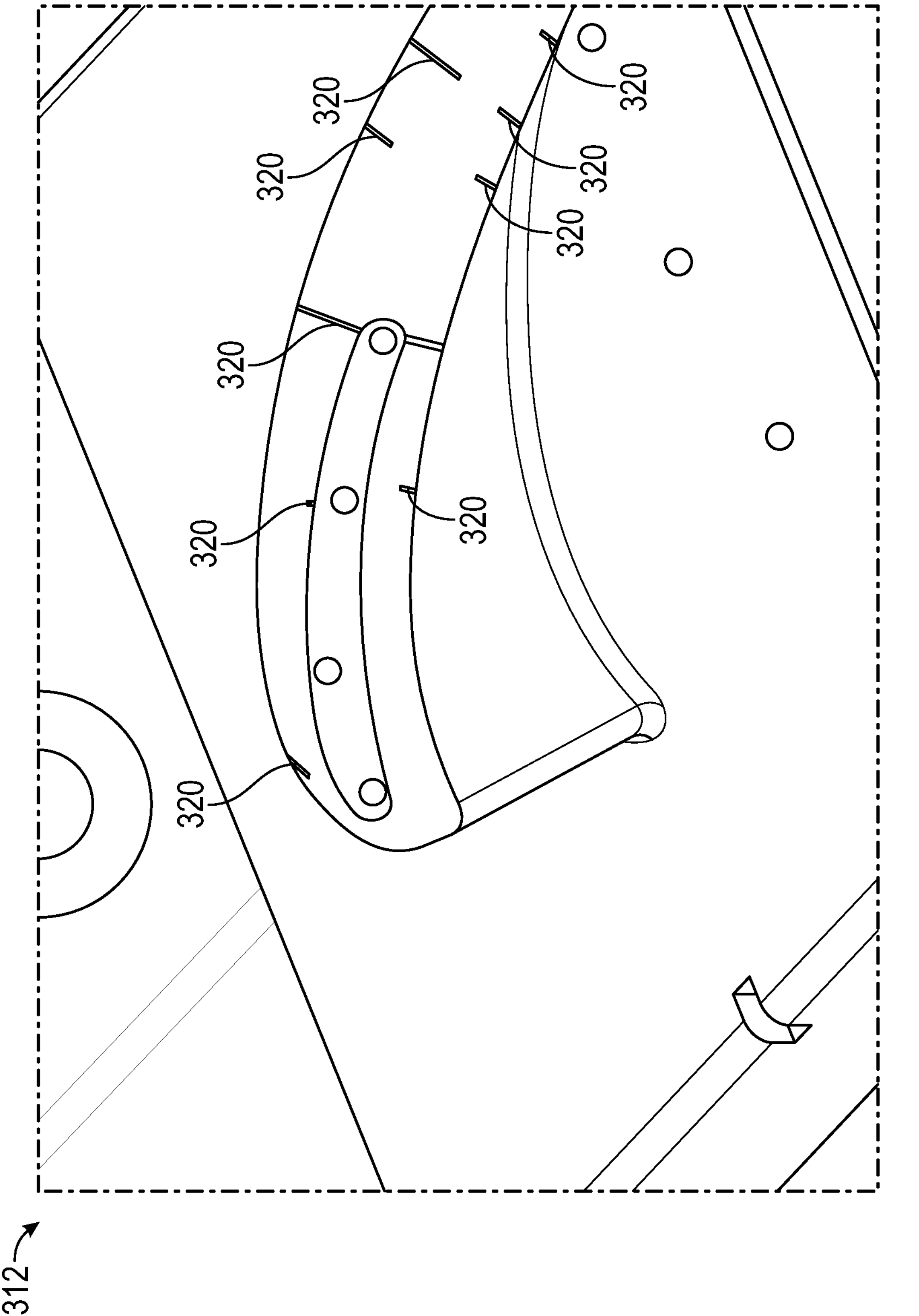
FIG. 3B depicts an image captured using the system of FIG. 3A according to one or more embodiments described herein.

For example, FIG. 3A depicts a block diagram of a system 300 according to one or more embodiments described herein. The system 300 provides for inspecting parts using geometric models. The system 300 includes an imaging system 310 for capturing a picture 312 of the part to be inspected. The imaging system 310 is an example of the system 200. FIG. 3B depicts an example of an image 312 captured by the imaging system 310. As can be seen, the system 300 can identify defects 320 on the part. According to a non-limiting embodiment, shaded areas (not shown) can be added around each of the defects 320 to visually highlight the defects 320. For example, the system 300 can use augmented reality to visually highlight the defects 320.

With continued reference to FIG. 3A, the system 300 can be used to perform a retrieval process, a presentation process, a comparison process, and/or an optimization process.

The retrieval process is now described. The retrieval process provides for comparing the features in the picture of the part 312 with the features of CAD models in a database of CAD models 302 and creating a list of candidate models for the part. One or more embodiments provide for retrieving a reference model, revision history, and service notes from digital storage (e.g., the database of CAD models 302) and presenting that information to an operator (e.g., the human operator 314) in a way that facilitates repeatable inspection, consistent diagnosis of defects, and enhancing other metrics. The retrieval process involves identifying the part type, its features or number, and searching a database by these part attributes prior to presenting them to the operator 314. One approach for part identification is to automatically compare visual features of the part observed through the image with features observed in models stored in a repository, displaying a few top candidates to the operator for selection of a relevant CAD model 304.

The presentation process is now described. The presentation process provides for estimating an imaging system pose/scale using the estimation engine 306 and then rendering a 3D model at the pose/scale of the imaging system 310 to create, using the synthetic engine, a synthetic image 308 that contains relevant features of the part. One or more embodiments provide for displaying textual and multimedia information. For example, the geometric model of the part can be displayed in the same pose, scale, and view as the imaged part by comparing the visual features of the selected model (from the database 302) these features would appear from a hypothesized projection, viewpoint, pose and scale, with the observed visual features, and optimizing the hypothesis to minimize projection, viewpoint, pose and scale errors.

The comparison process is now described. The comparison process creates a part representation based on features (e.g., holes, edges, textures, etc.) and uses a resulting representation to create detectors for feature in synthetic images, to merge adjacent views based on common features, and to learn sensitivity between features and camera pose/illumination/scale, etc. According to one or more embodiments, the comparison process involves creating a representation of the part based on a graph whose nodes are aspects indexed by pose, viewpoint, projection, and scale and whose edges connect adjoining views. The nodes contain a structure to capture the aspect of the model features as they would appear from a part pose, scene illumination, with a virtual camera viewpoint, its projection function, and scale. The features include edges, patches, corners, textures, holes, bars, cracks, crevices, and/or other markings that are visible, stable and distinct in inferring the aspect of the representation. The feature attributes include their positions, orientations, or size. One element of producing the representation is by generating a sequence of poses and viewpoints representing each aspect, applying detectors to predict the features, then pruning them by their visibility, strength, stability, persistence. Another element of producing the representation is to merge adjoining aspects that largely share features, and splitting an aspect where features under go much change. A third element of creating an aspect is to learn the sensitivity between feature attribute errors and part pose, and camera viewpoint, illumination, and scale errors. If the part is mounted on a kinematic apparatus such as a stage, robot, or mechanical device with articulated degrees of freedom, then an element of the representation includes calculating the sensitivity between feature attribute errors and control variables used to manipulate the apparatus. The calculations of relationships between features in an expected 2D image and the 3D world empirically through simulation of the image from a model is provided. The comparison process involves comparing the feature attributes of the hypothesized aspect features and the features detected in the observed image of the part.

The optimization process is now described. According to one or more embodiments described herein, the optimization process utilizes the representation to automatically determine best values of camera pose/scale/illumination. The optimization process involves the application of L0, L1 and L infinity norms with L2. According to a non-limiting embodiment, the process involves combining one or more L norms, e.g., LO, L1, L2 and L infinity, in both a gradient and a Markov chain Monte Carol (MCMC) approach for finding the optimal values of the part pose, camera viewpoint, scale or kinematic control variables. One element of the comparison is to produce a matching viewpoint. Another element is to locate the matching part for identification. One possible application of optimization process includes tracking using inertial measurements or joint angle measurements or kinematic measurements to select an approximate aspect and then to optimize from this initial condition. This is done, for example continually, as the object is manipulated to track the imaged view.

An aspect of the presentation involves the human operator 314 manipulating the part or the camera and the program automatically adjusting the variables of the aspect to maintain a consistent view. The presentation could be a tandem display or an overlay.

According to one or more embodiments described herein, the features and functionality described herein can be applied to any repair processes as well as the inspection processes, can be used in a manual application to aid the human operator 314, for such tasks as inventory management, can provide for automated inspection application to provide a method in which the CAD model is utilized to improve accuracy/efficiency of automated inspection, and/or the like, including combinations and/or multiples thereof.

Figure 4:
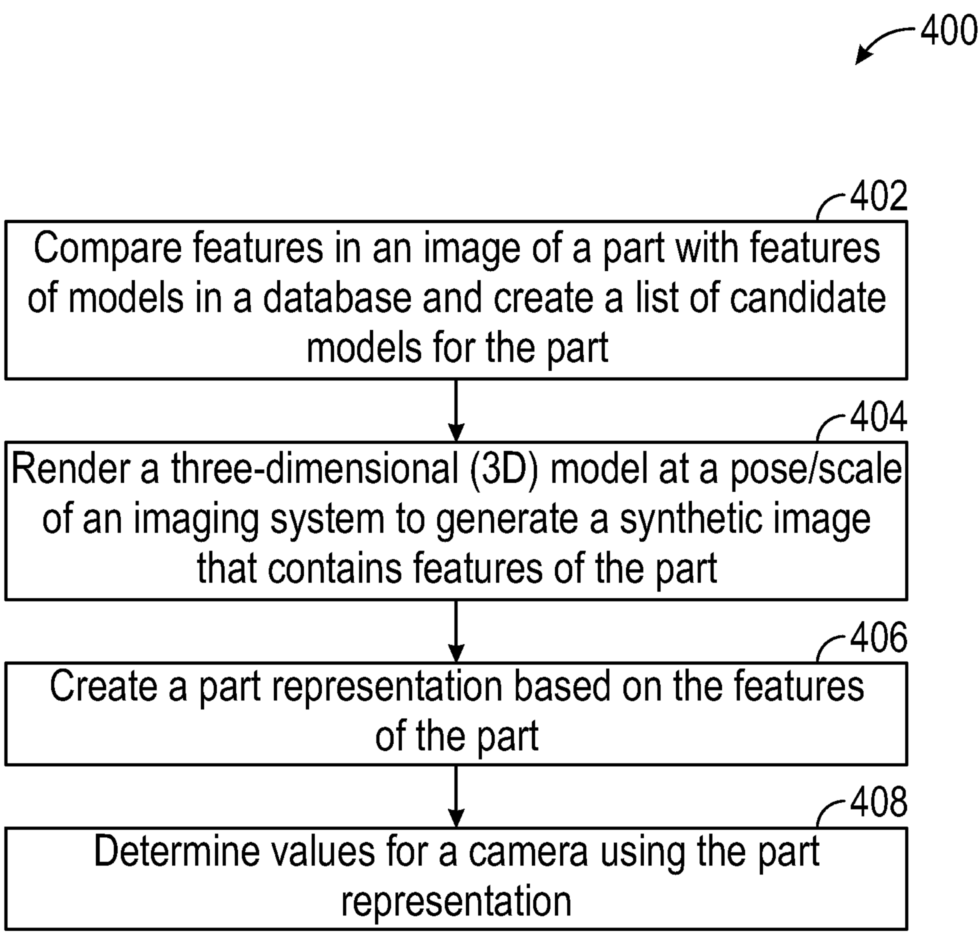
FIG. 4 is a flow diagram of a method according to one or more embodiments described herein.

FIG. 4 is a flow diagram of a method 400 according to one or more embodiments described herein. The method 400 can be performed using any suitable system and/or device. For example, the method 400 can be performed using the processing system 210 of FIG. 2, the system 300 of FIG. 3, and/or the like, including combinations and/or multiples thereof.

Figure 5A:
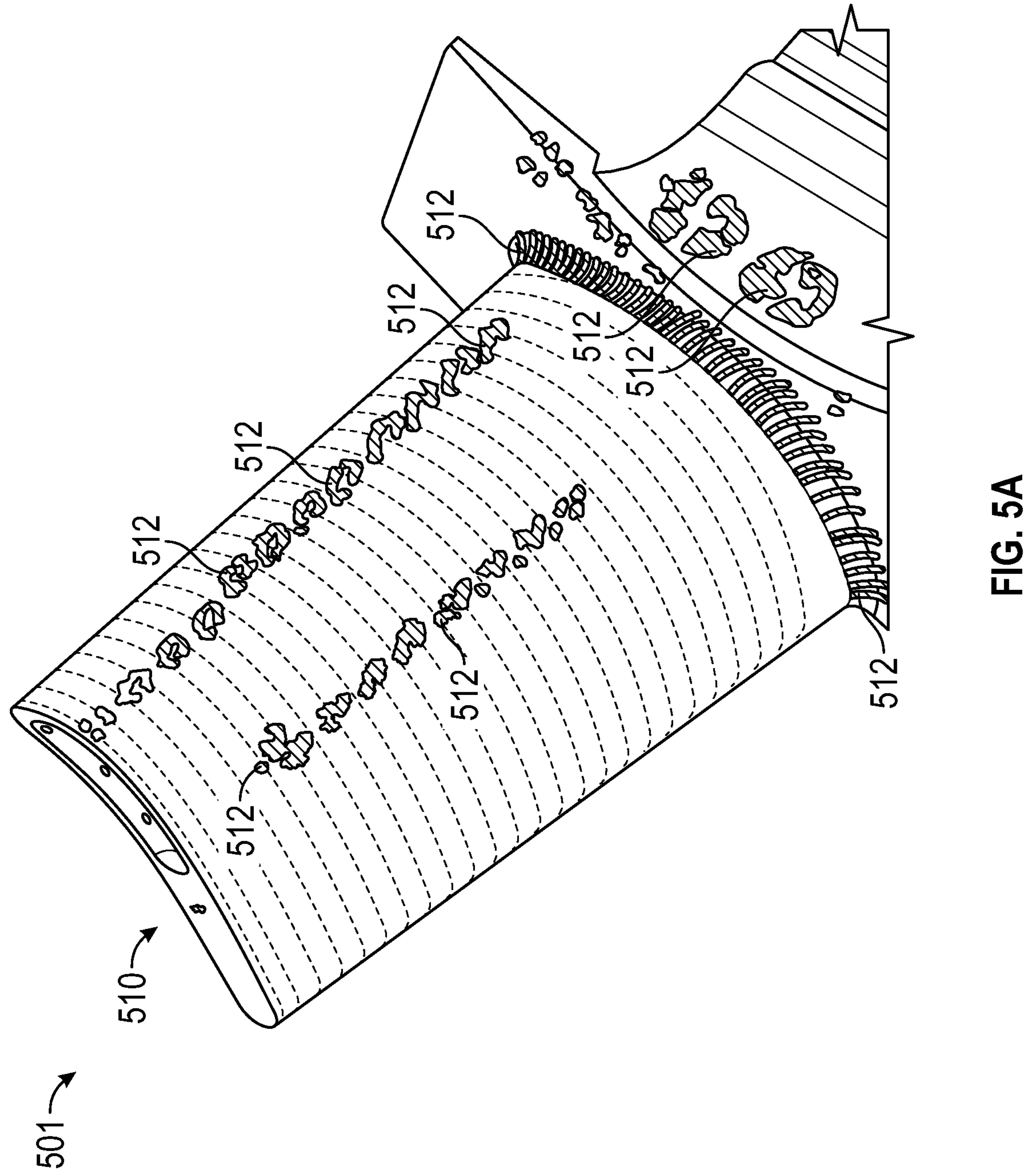
FIGS. 5A, 5B, and 5C depict examples of images according to one or more embodiments described herein.
Figure 5B:
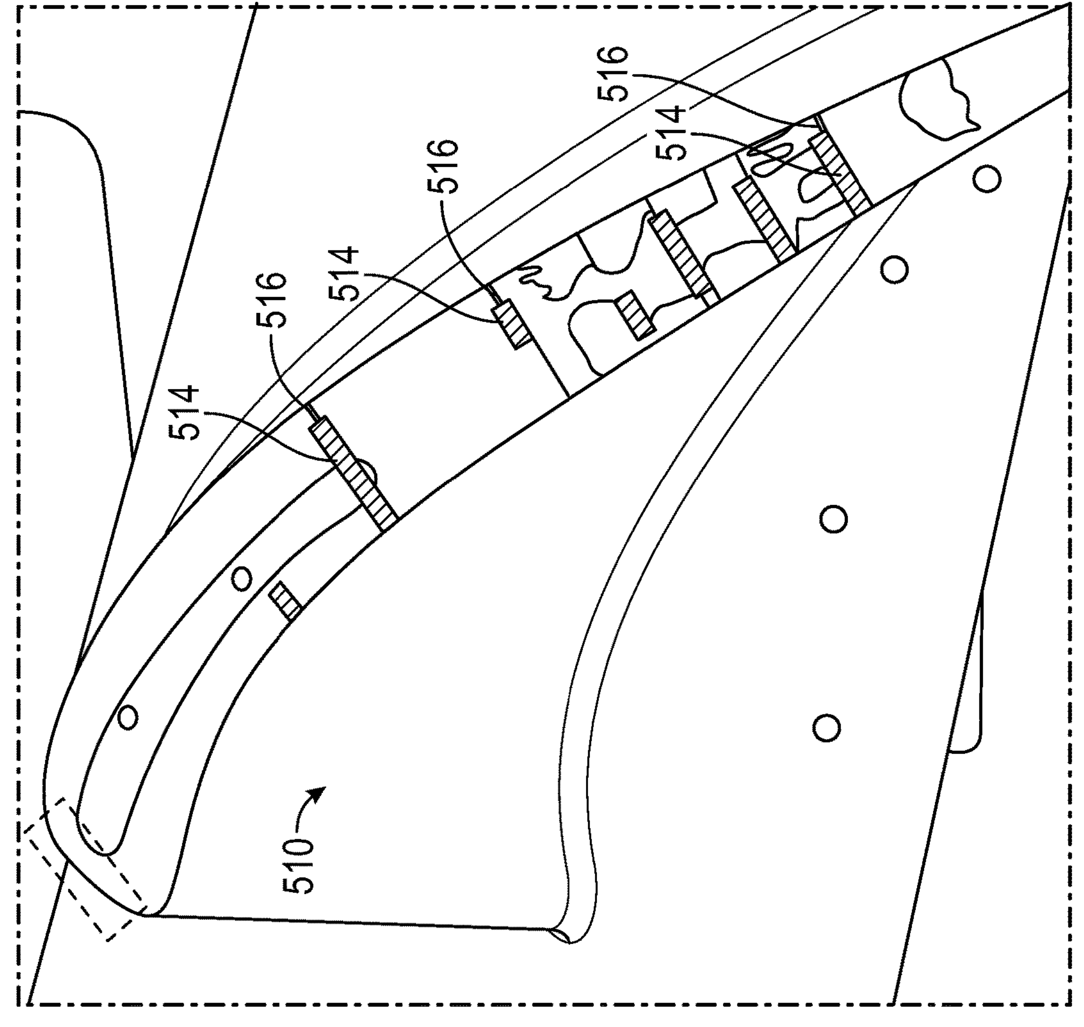

At block 402, the method includes performing a retrieval process as described in FIG. 3. For example, at block 402, the system 300 compares features in an image of a part with features of models in a database and creates a list of candidate models for the part. According to one or more embodiments described herein, this is performed using a random sample consensus (RANSAC) algorithm, a histogram of gradient features, and/or the like, including combinations and/or multiples thereof. At block 404, the method 400 includes preforming a presentation process as described in FIG. 3. For example, at block 404, the system 300 renders a three-dimensional (3D) model at a pose/scale of an imaging system to generate a synthetic image that contains features of the part. An example is shown, for example, in FIG. 5A, where an image 501 represents the synthetic image and shows a 3D model of a part 510 at a pose/scale of the imaging system 310. The image 501 includes features 512 of the CAD model. As shown in FIG. 5B, an image 502 of the part 510 can include at an indicium 514 (e.g., an augmented reality element) associated with a defect 516.

Figure 5C:
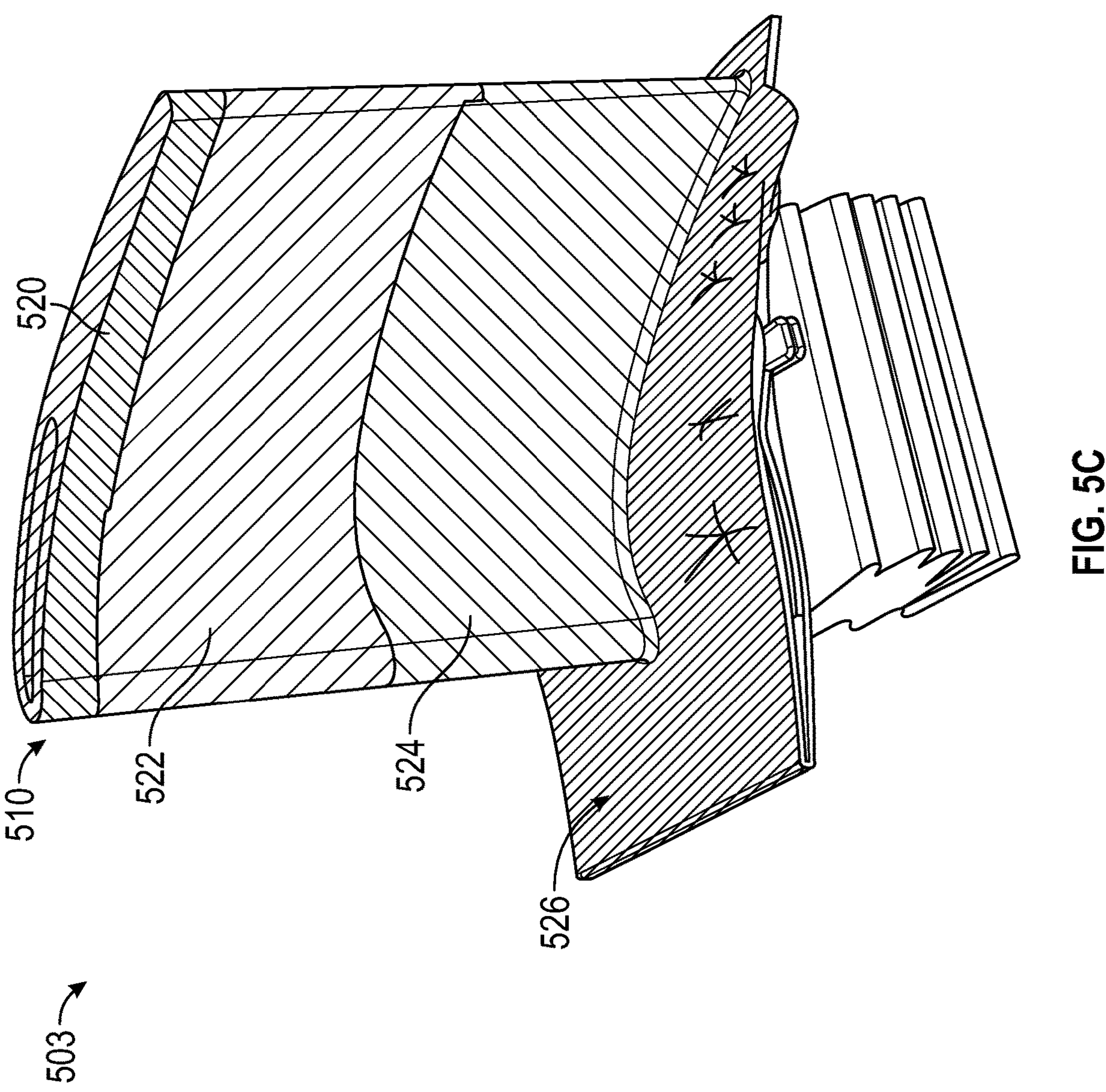

With continued reference to FIG. 4, at block 406, the method 400 includes performing a comparison process as described in FIG. 3. For example, at block 406, the system 300 creates a part representation based on the features of the part. At block 408, the method 400 classifies regions of the part based on a set of rules defined in a technical manual or other similar source. This enables the system 300 to determine whether the defect is within an allowable tolerance for the part. For example, different regions can have different tolerances for defects, and different regions of a part can have different tolerances for defects. As an example, as shown in FIG. 5C, an image 503 shows the part 510 having a plurality of regions 520, 522, 524, 526, where each of the regions can have an associated tolerance based on where the defect is on the part 510.

Additional processes also may be included, and it should be understood that the process depicted in FIG. 3 represents an illustration, and that other processes may be added or existing processes may be removed, modified, or rearranged without departing from the scope of the present disclosure.

According to one or more embodiments described herein, the processing system 210 of FIG. 2 can use the retrieval process of FIGS. 3 and 4 to conduct a performance-based assessment for a part. For example, the processing system 210 can retrieve a 3D model for a part as described herein. The processing system 210 can then perform a stress analysis for the part based on the 3D model for the part to determine whether the part meets a performance specification. A technical manual or other source may define a performance specification for a part (e.g., the part is limited to a certain number of defects not to exceed a certain size). According to an embodiment, the processing system 210 maps the part to a 3D model as described herein, conducts a stress analysis by comparing limits for the part defined by the CAD model, and determines whether the part satisfies the limits for the part. This can be useful, for example, to determine whether multiple defects, in the aggregate, negatively affect performance. For example, a part may define that no defect can be greater than 2 mm because a certain amount of part deformity occurs in such cases. However, multiple defects less than 2 mm may result in a similar (and undesirable) part deformity. The stress analysis can determine when this is the case to avoid part failure even where no single defect exceeds a limit, for example.

According to one or more embodiments described herein, the system 300 estimates the pose/scale for the camera of the imaging system 310 using the estimation engine 306. To perform the estimate, the estimation engine 306 can use one or more machine learning algorithms and/or other mathematical techniques. One example is as follows.

Figure 6:
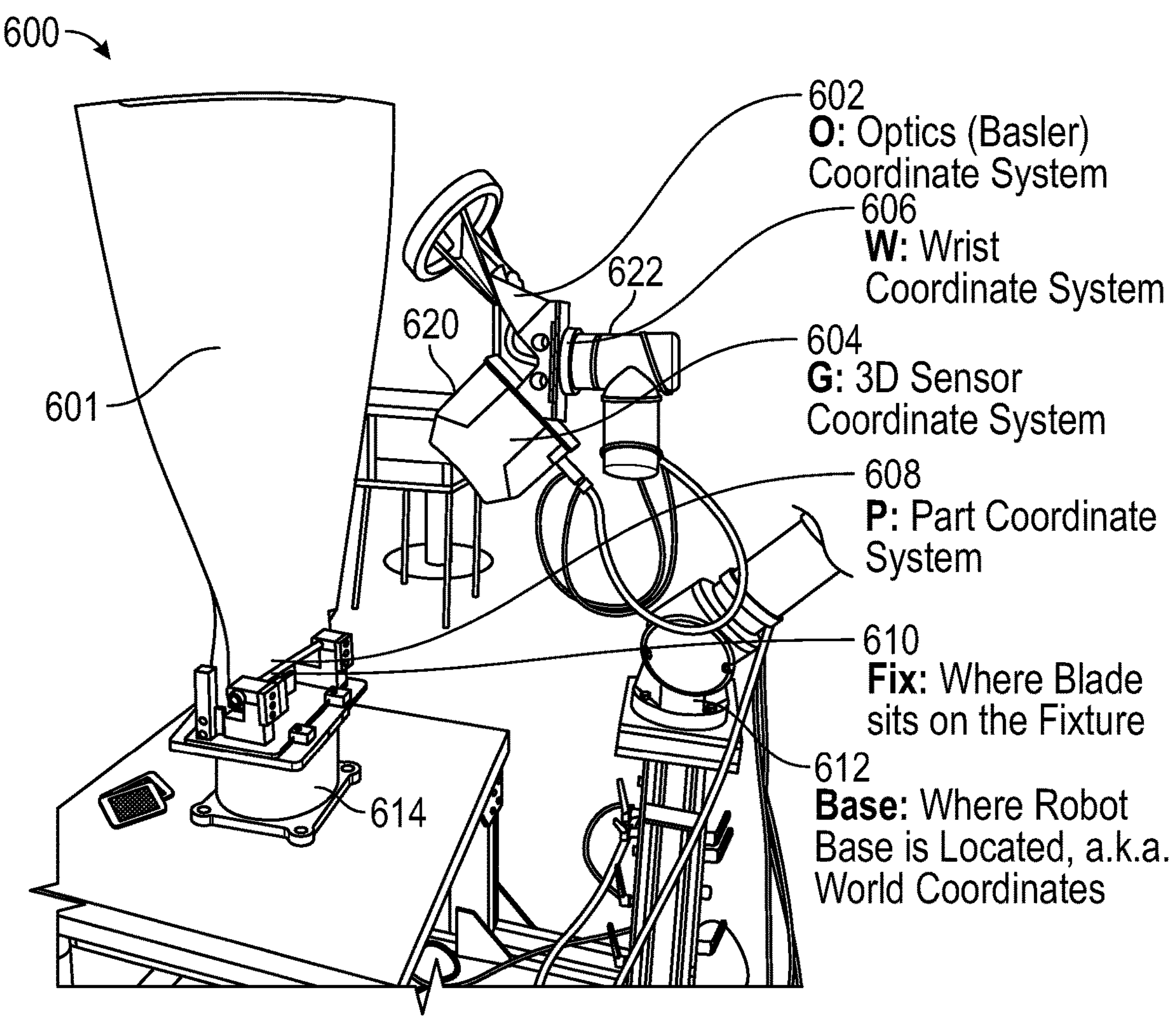
FIG. 6 depicts an imaging system according to one or more embodiments described herein.

To perform the estimate, it must be understood that multiple coordinate systems exist for the system 300. For example, FIG. 6 shows an imaging system 600 (e.g., the imaging system 310) that includes an optics coordinate system 602, a 3D-imaging sensor capturing device coordinate system 604, a wrist coordinate system 606, and a part coordinate system 608. The imaging system 600 also includes a fixture 610 ("FIX") to hold a part 601 and a base 612, in a world coordinate system, affixed to a rotary table 614. In another non-limiting embodiment, the part 601 may be held fixed and a robotic arm can move (e.g., rotate) about the part 601.

The following values can be determined:

$$R_O^I,$$

which is an image to optics (R_Intrinsic) estimated by a camera calibration;

$$R_W^O,$$

which is a camera optics to wrist transform (R_Extrinsic), estimated by hand-eye calibration;

$$R_{BASE}^W,$$

arm pose which is received from the robot;

$$R_{FIX}^{BASE},$$

which is estimated by a work cell calibration rotary to base received from the robot;

$$R_P^{FIX},$$

which is a fixture to blade root identify matrix (y-z swapped);

$$R_W^G,$$

which is used during dynamic path planning and can be manually estimated from CAD models of capturing device and 3D mount; and $$R_{FIX}^{PATTERN},$$

which is used during test of performance over a pattern.

An optics-to-capturing-device transformation can be performed. An InspectAR function detects a defect on the image plane and transforms it to a point in world coordinate system. The defect includes, but is not limited to, a dent, a crack, or surface erosion. This will be impacted by any error due to work cell calibration since $$R_{FIX}^{BASE}$$

is involved. Then, the robot calculates the arm pose based on capturing device matching the defect's (e.g., dent) location in the world coordinate system. The capturing device takes an image of the part. According to one or more embodiments described herein, capturing device intrinsic, capturing device optics coordinate origin, and capturing device origin to wrist transforms may not be estimated as these values are all calculated based on CAD models and specification sheets. The InspectAR records $$R_O^I$$

is defined in a "basler_cam.yaml" file, and $$R_W^O$$

is defined in a "default_arm2cam file" for example.

Based on these values, the estimation engine 306 estimates the pose/scale for the camera of the imaging system 310. For example, the estimation engine 306 uses these values to calculate/estimate the pose/scale using the following equation:

$$R_{Image}^{Dent}(i) = R_P^D R_F^P R_{Wrist}^{Fix}(i) R_O^W R_O^I.$$

In this example, a camera 620 (e.g., a capturing device) is rigidly mounted to a robot arm 622. A calibration pattern (not shown) is rigidly mounted to the base 612. The robot arm and calibration pattern poses are known, as is the rotary table position 614. In other non-limiting embodiments, the part 601 may be held fixed and the robotic arm 622 can move (e.g., rotate) about the part 601.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:

comparing features in an image of a part having a defect located in part region with features of models in a database and creating a list of candidate models for the part;

estimating a pose/scale of an imaging system to determine an actual pose/scale of the part appearing in the image;

rendering a three-dimensional (3D) model at the pose/scale of the imaging system to generate a synthetic image that has a synthetic pose/scale matching the actual pose/scale of the image and that contains features of the part;

creating a part representation based on the features of the part, wherein the part representation depicts a synthesized defect at a synthesized region of the synthesized image that matches a part region of the part appearing in the image; and classifying a part region of the part appearing in the image based on a set of rules for the part and the synthesized defect at the synthesized region of the synthesized image to determine whether the defect is within an allowable tolerance for the part, wherein the allowable tolerance is assigned to the part region and the allowable tolerance is selected based on a location of the part region on the part.

2. The method of claim 1, further comprising capturing the image of the part using the imaging system.

3. The method of claim 1, further comprising determining values for a camera using the part representation.

4. The method of claim 1, wherein the synthetic image comprises an indicium associated with a defect of the part.

5. The method of claim 1, wherein different tolerances are assigned to different part regions containing a defect and wherein an assigned tolerance among the different tolerances is selected based on a location of a part region among the different part regions.

6. A processing system comprising:

a memory comprising computer readable instructions; and a processing device for executing the computer readable instructions, the computer readable instructions controlling the processing device to perform operations comprising:

comparing features in an image of the part with features of models in a database and creating a list of candidate models for the part;

retrieving a three-dimensional (3D) model for the part from the list of candidate models based on the comparison;

estimating a pose and scale (pose/scale) of an imaging system to determine an actual pose/scale of the part appearing in the image;

rendering a three-dimensional (3D) model at the pose/scale of the imaging system to generate a synthetic image that has a synthetic pose/scale matching the actual pose/scale of the image and that contains features of the part; and creating a part representation based on the features of the part, wherein the part representation depicts a synthesized defect at a synthesized region of the synthesized image that matches a part region of the part appearing in the image;

performing a stress analysis for the part based on the 3D model for the part to determine whether the part meets a performance specification by classifying a part region of the part appearing in the image based on a set of rules for the part and the synthesized defect at the synthesized region of the synthesized image, wherein an allowable tolerance is assigned to the part region and the allowable tolerance is selected based on a location of the part region on the part.

7. The processing system of claim 6, wherein the image of the part is captured using the imaging system.

8. The processing system of claim 6, wherein the performance specification for the part defines a limit on a size of a defect for the part.

9. The processing system of claim 6, wherein the performance specification for the part defines a limit on a number of defects for the part.

10. The processing system of claim 6, wherein the performance specification for the part defines a limit a total amount of part deformity that is acceptable.

11. The processing system of claim 6, wherein different tolerances are assigned to different part regions containing a defect and wherein an assigned tolerance among the different tolerances is selected based on a location of a part region among the different part regions.

* * * * *